United States Patent
Olszak et al.

(10) Patent No.: US 6,624,894 B2
(45) Date of Patent: Sep. 23, 2003

(54) SCANNING INTERFEROMETRY WITH REFERENCE SIGNAL

(75) Inventors: Artur Olszak, Tucson, AZ (US); Joanna Schmit, Tucson, AZ (US)

(73) Assignee: Veeco Instruments Inc., Tucson, AZ (US)

( * ) Notice: Subject to any disclaimer, the term of this patent is extended or adjusted under 35 U.S.C. 154(b) by 22 days.

(21) Appl. No.: 09/888,826

(22) Filed: Jun. 25, 2001

(65) Prior Publication Data

US 2002/0196450 A1 Dec. 26, 2002

(51) Int. Cl.$^7$ ................................................ G01B 11/02
(52) U.S. Cl. ........................................................ 356/511
(58) Field of Search .................................. 356/497, 511, 356/512

(56) References Cited

U.S. PATENT DOCUMENTS

| | | | | |
|---|---|---|---|---|
| 5,471,303 A | | 11/1995 | Ai et al. ....................... 356/357 |
| 5,589,938 A | * | 12/1996 | Deck ............................ 356/497 |
| 5,658,700 A | * | 8/1997 | Sakai ........................... 356/500 |
| 5,659,392 A | * | 8/1997 | Marcus et al. ............... 356/497 |
| 5,883,712 A | * | 3/1999 | Coffin .......................... 356/452 |
| 5,953,124 A | | 9/1999 | Deck ............................ 356/357 |
| 5,956,130 A | * | 9/1999 | Vancaillie et al. ............ 356/39 |
| 6,285,456 B1 | * | 9/2001 | Narumi ........................ 356/497 |
| 6,369,898 B1 | * | 4/2002 | Van Saarloos et al. ..... 356/497 |

OTHER PUBLICATIONS

Harasaki, Akiko, et. al. "Improved vertical scanning interferometry." Applied Optics, vol. 39, No. 13, May, 1, 2000, pp. 2107–2115.*

K. Creath, "Temporal Phase Measurement Methods," Interferogram Analysis, Institute of Physics Publishing Ltd., Bristol, 1993, pp. 94–140.

K. G. Larkin, "Efficient Nonlinear Algorithm for Envelope Detection in White Light Interferometry," J. Opt. Soc. Am., A/vol. 13, 832–843, 1996.

A. Harasaki et al., "Improved Vertical Scanning Interferometry," Appl. Opt. 39, 2107–2115, 2000.

Schwider et al., "Digital Wavefront Measuring Interferometry: Some Systematic Error Sources," Applied Optics, vol. 22, 3421–3422, 1983.

* cited by examiner

Primary Examiner—David V. Bruce
Assistant Examiner—Thomas R. Artman
(74) Attorney, Agent, or Firm—Antonio R. Durando; Durando Birdwell & Janke, PLC

(57) ABSTRACT

A reference signal is used to track the actual behavior of the scanner in an interferometer to produce scanner-position data that can be used to correct errors introduced by scanner nonlinearities and other error sources. A narrow-band light source is advantageously utilized to cover the entire range of operation of the scanner. Because of the independent reference channel, the invention is suitable for implementation with all types of conventional interferometric techniques. The concept is preferably implemented by utilizing an additional light source and the same scanner used for the measurement, so that the OPD varies in synchronization of both the reference-signal and data-collection procedures. Alternatively, a high temporal-coherence filter may be used with the same light source and optical path used for the interferometric measurement.

26 Claims, 7 Drawing Sheets

SCANNING INTERFEROMETRY WITH REFERENCE SIGNAL

BACKGROUND OF THE INVENTION

1. Field of the Invention

This invention is related in general to the field of scanning interferometry and, in particular, to a new approach for correcting motion nonlinearities and other scanning errors occurring during interferometric measurements.

2. Description of the Related Art

Conventional scanning interferometry utilizes a light source, such as white light or a laser beam, to produce interference fringes at a light detector as the optical path difference (OPD) between a test surface and a reference surface is varied during a vertical scan. All measurement techniques based on phase shifting interferometry (PSI), vertical scanning interferometry (VSI, also referred to as white-light interferometry), combinations of VSI and PSI, phase shifting interferometry on-the-fly (PSIOTF), and lateral scanning interferometry (LSI, disclosed in Ser. No. 09/569,131) rely on an analysis of the interference between two beams of light. One beam (the object beam) is reflected from the sample; the other beam (the reference beam) is reflected from the reference mirror; and the two beams are recombined to create an interference pattern (the interferogram) at each scanning step. A detector (usually a CCD camera) registers the interferogram in a number of frames while the optical path difference (OPD) between the interfering beams is changing in a predefined fashion, which is realized either by moving the object, or by scanning the interferometric objective or the reference mirror at a preferably constant speed. The resultant shape of the sample object is calculated based on the intensity patterns in the interferograms and can be used to describe the height profile of the sample.

PSI is preferably used for measurements of smooth surfaces with small changes in profile (see K. Creath, "Temporal Phase Measurement Methods," Interferogram Analysis, Institute of Physics Publishing Ltd., Bristol, 1993, pp. 94–140). VSI is generally used to measure smooth and/or rough surfaces with large interpixel height ranges (K. G. Larkin, "Efficient Nonlinear Algorithm for Envelope Detection in White Light Interferometry," J. Opt. Soc. Am., A/Vol. 13, 832–843 (1996). The combination of VSI and PSI has been used, for example, to measure large steps with PSI precision (C. Ai, U.S. Pat. No. 5,471,303). The PSIOTF technique, which is a particular case of VSI and PSI combination, improves measurements of smooth surfaces in the larger height range (A. Harasaki et al., "Improved Vertical Scanning Interferometry," Appl. Opt. 39, 2107–2115, 2000).

In VSI, interference fringes are localized only in a small region around the focus because of the low coherence source and/or the high numerical aperture of the microscope objective typically employed. While scanning through focus, fringes for different parts of the sample surface are produced and analyzed resulting in an unambiguous measurement of the object shape. As is well understood in the art, the height information from a low-coherence interferogram can be retrieved in many ways, such as, for example, by peak detection of the coherence envelope or fringe, by calculation of the centroid of the intensity signal, or by determination of the slope of the phase of the average wavelength. All these methods of analysis estimate the best vertical-scan focus position for a given pixel by sensing the coherence peak and utilize this information to determine the relative height difference between pixels (that is, a relative height profile of the test surface).

In PSI techniques, the interference fringes are examined only around a single focus position using a quasi-monochromatic light source such as a laser. PSI was introduced to the discipline of optics in 1974 from the telecommunications field (see J. H. Bruning et al., "Digital Wavefront Measuring Interferometer for Testing Optical Surfaces and Lenses," Appl. Opt. 13, 2693–2703, 1974). Since then many applications of PSI have been developed for optics, resulting in a large number of reliable and robust algorithms (see, for example, P. Hariharan et al., "Digital Phase Shifting Interferometry: a Simple Error-Compensating Phase Calculation Algorithm," Appl. Opt. 26, 2504–2505, 1987; and J. Schwider et al., "Digital Wave-Front Measuring Interferometry: Some Systematic Error Sources," Appl. Opt. 22, 3421–3432, 1983). These algorithms produce phase measurements that may be ambiguous (because of so-called $2\pi$ ambiguities) and therefore require further processing to remove the ambiguity by unwrapping the phase data. Because of this limitation, only objects with relatively small inter-pixel height differences can be measured using conventional PSI analysis. On the other hand, the advantage of PSI over VSI techniques is that PSI allows for more precise measurements.

The PSIOTF technique affords the high precision of PSI combined with the lack of ambiguity of VSI measurements. Accordingly, this combined technique is often utilized for determining the shape of smooth surfaces with moderate to large height differences (that is, surfaces with steep profiles). The procedure first involves finding a coarse focus position for each pixel using a VSI technique; then a PSI algorithm is applied to the intensity data collected at frames around this focus position to achieve a high precision measurement where the $2\pi$ ambiguity has already been resolved by VSI. The PSIOTF technique can be used with a low-coherence light source or with a combination of both low- and high-coherence sources. In addition, the technique can be applied to each pixel individually or to groups of pixels in separate areas, as in the case of a stepped sample surface with separate smooth and flat regions.

All of these interferometric applications rely on accurate calibration of the scanning device used for changing the optical path difference (OPD) between the test object and the reference surface. Accordingly, these procedures cannot tolerate material departures from the calibrated condition. Scanner miscalibration, nonlinearities and vibrations affect the surface-profile measurements produced by PSI, VSI and PSIOTF algorithms by attributing an incorrect size to each scanner step, which in turn yields erroneous relative height measurements. Thus, the rate of change in OPD, normally referred to in the art as the "phase step," needs to be well calibrated in order to achieve an accurate measurement. The most commonly used algorithms for the interferometric techniques used in the art require a predefined, nominal phase step which, once the scanner is calibrated, is assumed to remain constant along the whole scan for each measurement. However, this is not always the case and the errors in scanning speed influence the final result and need to be accounted for to achieve accurate measurements.

Calibration of the scanner is usually carried out as part of instrument maintenance and is assumed to remain unchanged during subsequent measurement runs. However, in fact the calibration may change, or the scanner can exhibit motion errors due to other influences such as friction, back-lash, etc. In such cases, these errors are carried forward into the measurement results in ways that depend on the type and magnitude of the phase-shift errors, and on the algorithm used to perform the interferometric analysis.

In view of the foregoing, it is recognized in the art that the advantage of high sensitivity afforded by optical interferometry is offset in part by its vulnerability to environmental influences, such as air convection, vibrations, scanner miscalibration and higher harmonics in the detected signal. A typical system operating at an average wavelength of 632 nm requires that scanning-step errors be confined to nanometer level; accordingly, all interferometric systems utilize some sort of vibration isolation, such as provided by air tables, or employ rather complicated active compensation circuits. This results in significant equipment cost and in limited mobility of such systems. In addition, these problems influence the range of applications and confine the use of interferometers to laboratories or selected in-field applications.

In practice, these errors cannot be easily corrected. They are also usually not repeatable from measurement to measurement, which adds to the difficulty of correcting them. Thus, eliminating or reducing the influence of these errors would be a great advance in the art and much work has been done to characterize errors associated with scanning perturbations. Improved algorithms have been developed to reduce sensitivity to error sources, but all state-of-the-art corrective techniques require intense calculations that greatly affect processing speed. For example, U.S. Pat. No. 5,953,124 describes a technique for correcting scanning nonlinearities using the three-dimensional interferogram produced by a completed vertical scan. The phase history determined within the coherence region of each pixel during the scan is temporally unwrapped to remove $2\pi$ ambiguities, and overlapping temporal phase histories gathered from different pixels are connected to produce a measured phase history for the entire scan range. This measured phase history is then compared to the temporal phase change nominally produced by each scanner step to correct the height profile of the test surface. The approach produces corrected results that account for scanner nonlinearities, but it requires unwrapping of the phase data and complex post-scan data manipulation. These requirements prevent utilization of the method on-the-fly and further increase time, storage, and data-processing demands.

Another approach is disclosed in commonly owned copending application Ser. No. 09/875,638, hereby incorporated by reference, wherein interferometric measurements are carried out in conventional manner to produce a correlogram corresponding to successive scanner steps. An approximation of the actual scan-step size between frames is calculated from multiple-frame intensity data collected around the frame of interest using common irradiance algorithms. The scan-step size so measured is then used to perform standard PSI analysis, instead of the scanner's nominal phase step. According to one embodiment of the invention, the phase step between frames is calculated directly utilizing a novel five-frame algorithm that produces an approximation of actual phase step for a given frame, rather than an average value of four steps around the frame. The method requires reduced data processing and can advantageously be applied "on-the fly" as intensity data are acquired during scanning.

In both of the above cases, the phase step used to correct for nonlinearities and other scanning errors is an approximation of the actual phase step because of the multi-frame use of irradiance data required to carry out the inventions. In addition, to the extent that all prior-art approaches to phase-step correction utilize measurement correlograms, they are susceptible to shortcomings in the measurement data available for analysis (for example, overlapping coherence regions may not be available for total coverage of the scan range). Therefore, there is still a need for a more general and precise approach to correcting the errors introduced by nonlinearities and other sources in the scanner of an interferometer, so that a correct height profile can be determined on the basis of a corrected, actual scanner position history, rather than the calibrated, nominal scanning trajectory. This invention provides a solution to this problem by utilizing a reference signal dedicated to tracking the actual phase step occurring between scanning frames.

BRIEF SUMMARY OF THE INVENTION

The primary objective of this invention is a method for monitoring the quality of the scan performed in an interferometric measurement and for correcting scanning errors produced by nonlinearities of the scanning mechanism and by other sources.

Another objective is an error-correction procedure that is independent of the characteristics of the light and optics used to perform the interferometric measurement.

Another goal is a technique that does not require phase unwrapping as an intermediate step to phase-step correction.

A final objective is a method that is suitable for implementation in conventional interferometric profilers and that is applicable for correction of PSI, VSI, VSI plus PSI, LSI or PSIOTF techniques.

Therefore, according to these and other objectives, the present invention consists of registering and storing an optical reference signal dedicated to providing a full history of the actual scanner motion, thereby allowing a determination of scanning errors at each step. The reference signal is independent of the light intensity information collected during the scan for measurement purposes. The concept may be implemented by utilizing an additional light source with the same scanner used for the measurement (with the same or a different detector), so that the OPD varies in synchronization of both the reference-signal and the data-collection procedures. Alternatively, a high temporal-coherence filter and/or a reduced numerical-aperture objective may be used with the same light source and optical path used for the interferometric measurement.

The important point is for the reference signal to provide intensity data that can be utilized to determine the exact position of the scanner at each step. To that end, the reference-signal interferometric set up is selected so as to optimize the precision with which this objective can be achieved. Thus, the reference signal may be acquired in the form of an interference signal at different or at the same wavelength as the profiler. The reference signal can be analyzed using any of several techniques used in the art to calculate the phase of the signal and/or analyze the shift of fringes during a scan. Thus, as would be apparent to one skilled in the art, these techniques include, without limitation, synchronous detection PSI, PSI with subtraction of ideal shift, average shift measurement algorithms, Fourier transform or other transform technique, correlation or convolution of data signal with a reference signal, zero-crossing, phase locked loop (pll), and any other technique used in telecommunication, electronics or signal processing.

In the preferred embodiment of the invention, the reference signal is obtained simultaneously with the measurement. but through the use of a different camera or point detector(s) than is used for collecting data for the surface measurement. The wavelength and the bandwidth of the reference signal are selected to have a coherence length sufficiently broad to cover the span of operation of the scanner. Thus, the use of a separate laser source is preferred, or a narrow bandwidth, filtered light from a halogen lamp. Furthermore, an additional aperture stop may be placed in the path of the light going to the reference signal detector to decrease the numerical aperture effect on the fringe envelope. The reference signal may reflect off the sample or some other object, like an additional mirror on the sample stage or the scanning device.

The phase step correction of the invention can be implemented during the measurement procedure with any type of measurement (VSI, PSIOTF, VSI+PSI, LSI or PSI) as a global calibration value or at each scanning position. An alternative option is to carry out the calibration with the reference signal before the measurement scan to determine the characteristics of the scanner, and to later use the calibration information either to control the scanner motion via a feedback loop or to correct each measurement step. Once error values have been calculated for each scan step, a look-up table may be constructed for the actual distances between frames acquired during the scan. This table can then be used to correct VSI, PSIOTF, LSI and PSI measurements. As a further option, the reference signal could be used in the feedback loop controlling the motion of the scanner.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The inventive concept of this disclosure resides in the idea of using a reference signal to track the actual behavior of the scanner in an interferometer to produce scanner-position data that can be used to correct errors introduced by scanner nonlinearities and other error sources. A narrow-band light source is advantageously utilized to cover the entire range of operation of the scanner. Thus, the invention is suitable for implementation with all types of conventional interferometric techniques.

The invention is described with reference to x, y and z orthogonal coordinates wherein x and y define the plane approximately parallel to the test surface and z defines the vertical scanning direction, but it is obvious that the structure and operation of the features detailed in this specification can be rotated in any direction with equivalent results. Also, the term "correlogram" is used to refer to the three-dimensional set of interferograms produced by a multistep scan during a conventional interferometric measurement. For the purposes of this disclosure, "nominal" phase step and "nominal" scan step refer to the design phase step and the corresponding design scan step, respectively, of the scanner in question. For processing convenience, the nominal phase step of current interferometric apparatus is typically calibrated to produce a phase change of $\pi/2$ or $3\pi/2$ at the mean wavelength $\lambda$ being used, with a corresponding optical-axis scan step of $\lambda/8$ and $3\lambda/8$, respectively.

Figure 1:
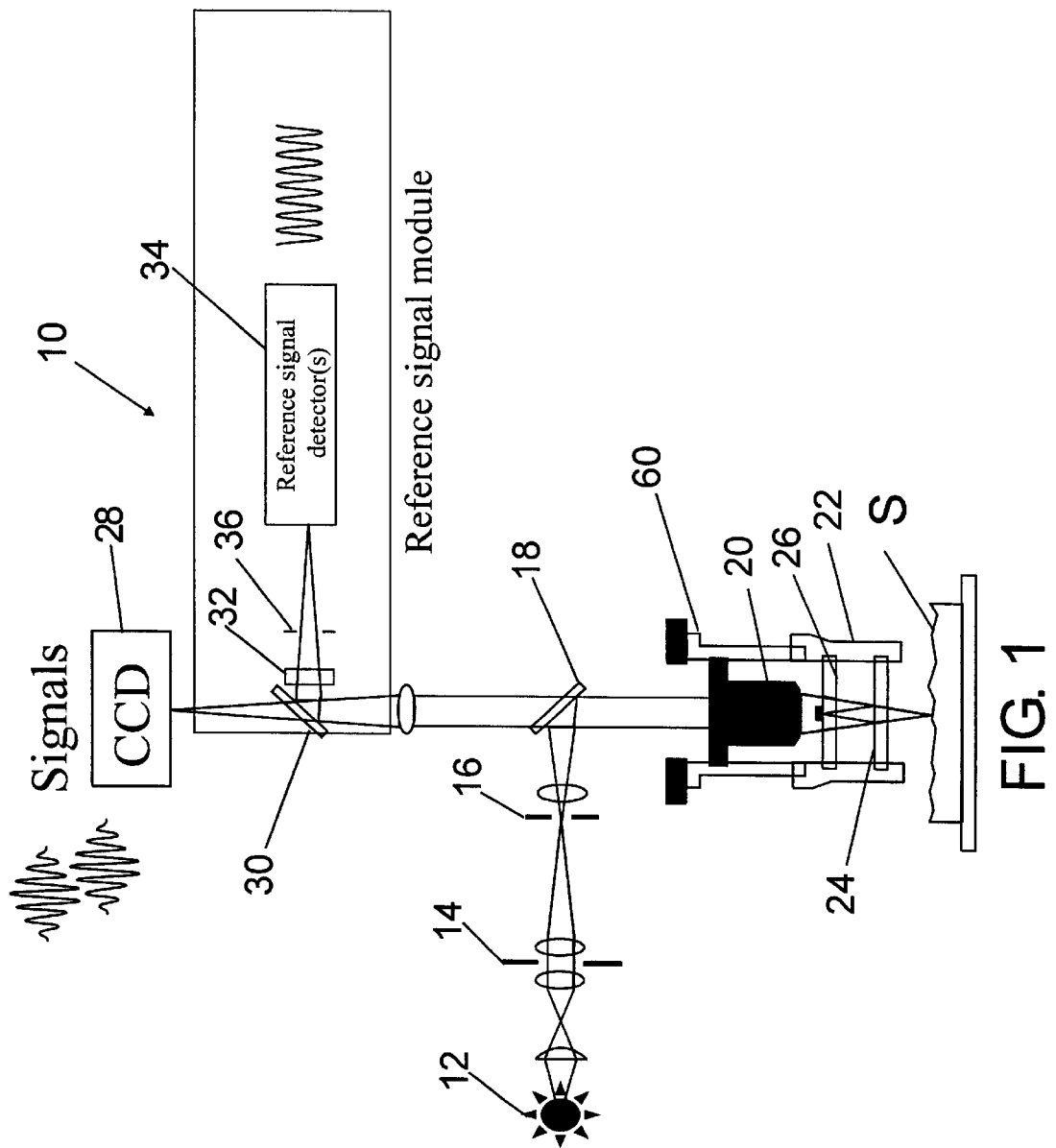
FIG. 1 is a schematic representation of a conventional interferometric profiler including a reference-signal channel according to the present invention in the form of a beam-splitter in the detection path to reflect a portion of the light toward a narrow-bandwidth filter, a stop, and a reference-signal detector.

In the simplest embodiment of the invention, the reference signal is acquired by adding a channel in the detection part of the instrument. Referring to the drawings, wherein like parts are designated throughout with like numerals and symbols, FIG. 1 illustrates in schematic view the basic configuration of a conventional interference microscope modified to produce a reference signal. The interferometer 10 comprises a light source 12 directing a beam of light through an aperture 14 and field stop 16 toward a beam splitter 18, which reflects the light in the direction of a test surface S. The light reflected by the beam splitter 18 passes through a microscope objective 20 focused on the test surface S. The objective incorporates an interferometer 22, such as Mirau, comprising a beam splitter 24 and a reference mirror 26 adapted for relative movement with respect to the test surface, so that two light beams are generated for producing interference fringes as a result of the optical path difference between the reference mirror and the test surface S. The beams reflected from the reference mirror 26 and the test surface S pass back up through the optics of the microscope objective 20 and through the beam splitter 18 to a solid-state detector array 28 in a camera in coaxial alignment with the objective 20. Typically, the detector array 28 consists of individual CCD cells or other sensing apparatus adapted to produce a two-dimensional array of digitized intensity data corresponding to light signals received at each sensor cell as a result of the interference of the coherent light beams reflected from individual x-y coordinates or pixels in the surface S and from corresponding coordinates in the reference mirror 26. Appropriate electronic hardware (not shown) is provided to transmit the digitized intensity data generated by the detector to a microprocessor for processing. The microscope objective 20, as well as the interferometer typically incorporated within it, is adapted for vertical movement to focus the image of the test surface on the detector array 28.

According to the invention, some of the light directed to the measurement-signal detector 28 is diverted by a beamsplitter 30 to a reference channel, where the light is passed through a narrow bandwidth filter 32 and collected by a reference-signal detector 34. The filter 32 is judiciously selected to provide a long coherence length, as required to obtain usable irradiance data during the entire length of the scan.

This approach has the advantage that the reference signal travels much of the same path as the measurement light, thus providing accurate information about the OPD change rate during the scan. For low numerical-aperture (NA) lenses, this is a convenient way to implement the idea. For high NA lenses, though, interference fringes become visible for smaller OPDs than would result simply from the coherence of the light source. (This is because of the interaction among rays hitting the object's surface at high angles.) Thus, the use of a narrow-bandwidth filter alone in the reference signal channel does not appreciably extend the signal range with respect to the measurement path. However, the influence of the lens' numerical aperture can be minimized by inserting an aperture stop 36 in front of the reference detector 34 to limit the effective NA of the lens and provide the required large depth of fringe visibility.

This common-path reference-signal implementation of the invention is an inexpensive way of providing the necessary information about scanner motion, but it can be limited by the amount of light available for detection after reflection by the beamsplitter 30. Also, the reference-signal acquisition process is necessarily limited to the same predetermined location on the sample surface corresponding to the location of the reference signal in the image plane of the detector. This limitation may affect the quality of the reference signal depending on the sample being measured.

Figure 2:
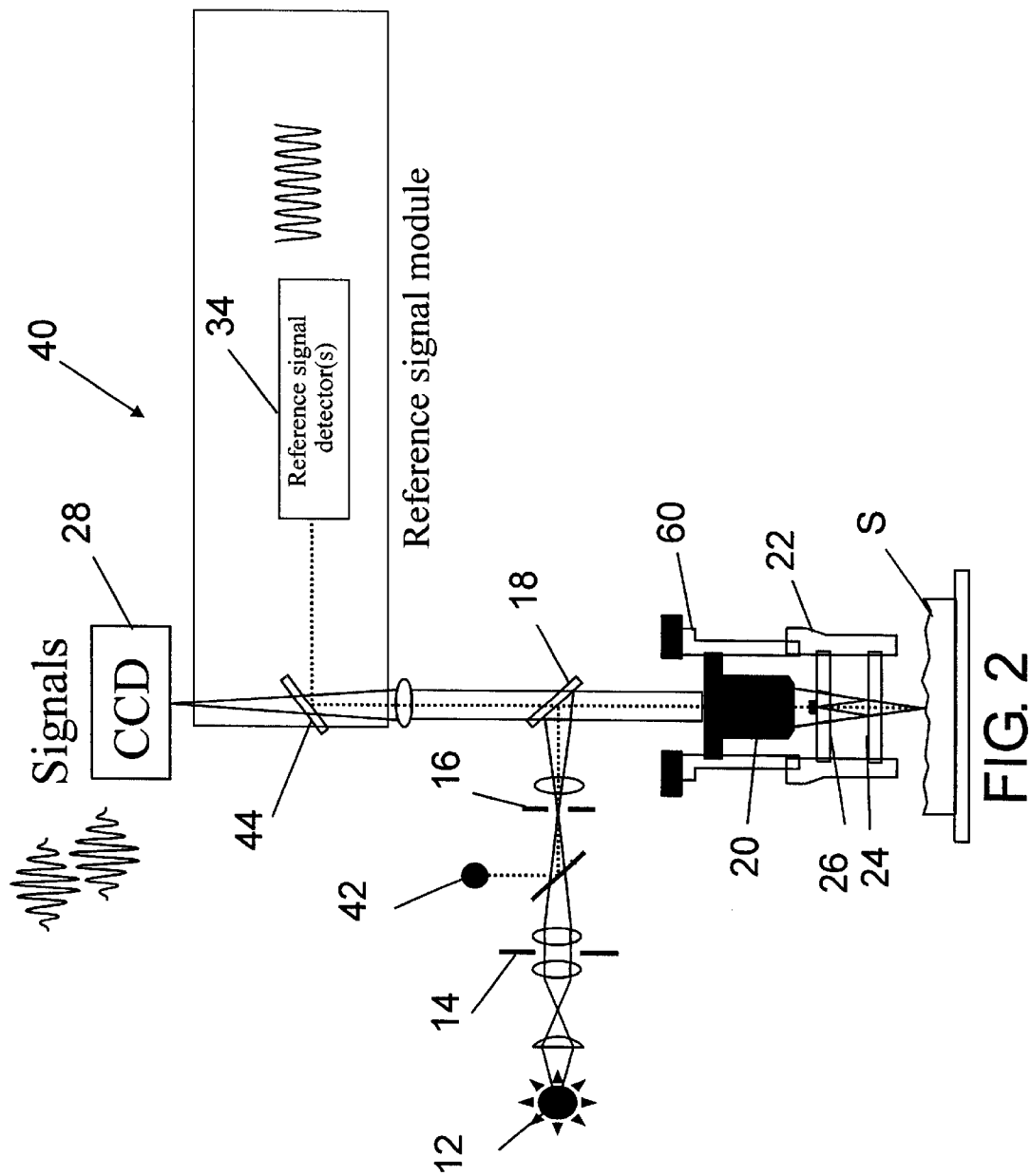
FIG. 2 is a schematic representation of the same conventional interferometric profiler of FIG. 1 including a reference-signal channel in the form of a separate laser source with a central wavelength outside the bandwidth of the broadband source, so that it can be selectively directed by a dichroic filter to a reference-signal module.

According to another embodiment 40 of the invention illustrated in FIG. 2, a separate laser source 42 is used for the purpose of producing a reference signal that shares the optical path of the measurement light. Instead of the narrow-bandwidth filter 32 of FIG. 1, the wavelength selection is done by a dichroic filter 44 that deviates the laser light towards the reference-signal detector 34 and blocks its passage towards the measurement-signal detector 28. As those skilled in the art would readily understand, the bandwidth of the measurement light is either not affected, or only altered in a very narrow bandwidth, which can be taken into account during analysis of the measurement data.

The advantage of this approach is that more light is available for the reference detector 34. Accordingly, the narrow width of the laser beam and the narrow bandwidth of its wavelength produce many good-contrast fringes over a long scanning range. Moreover, the reference signal is available to monitor changes in OPD directly and independently of the measurement signal.

Figure 3:
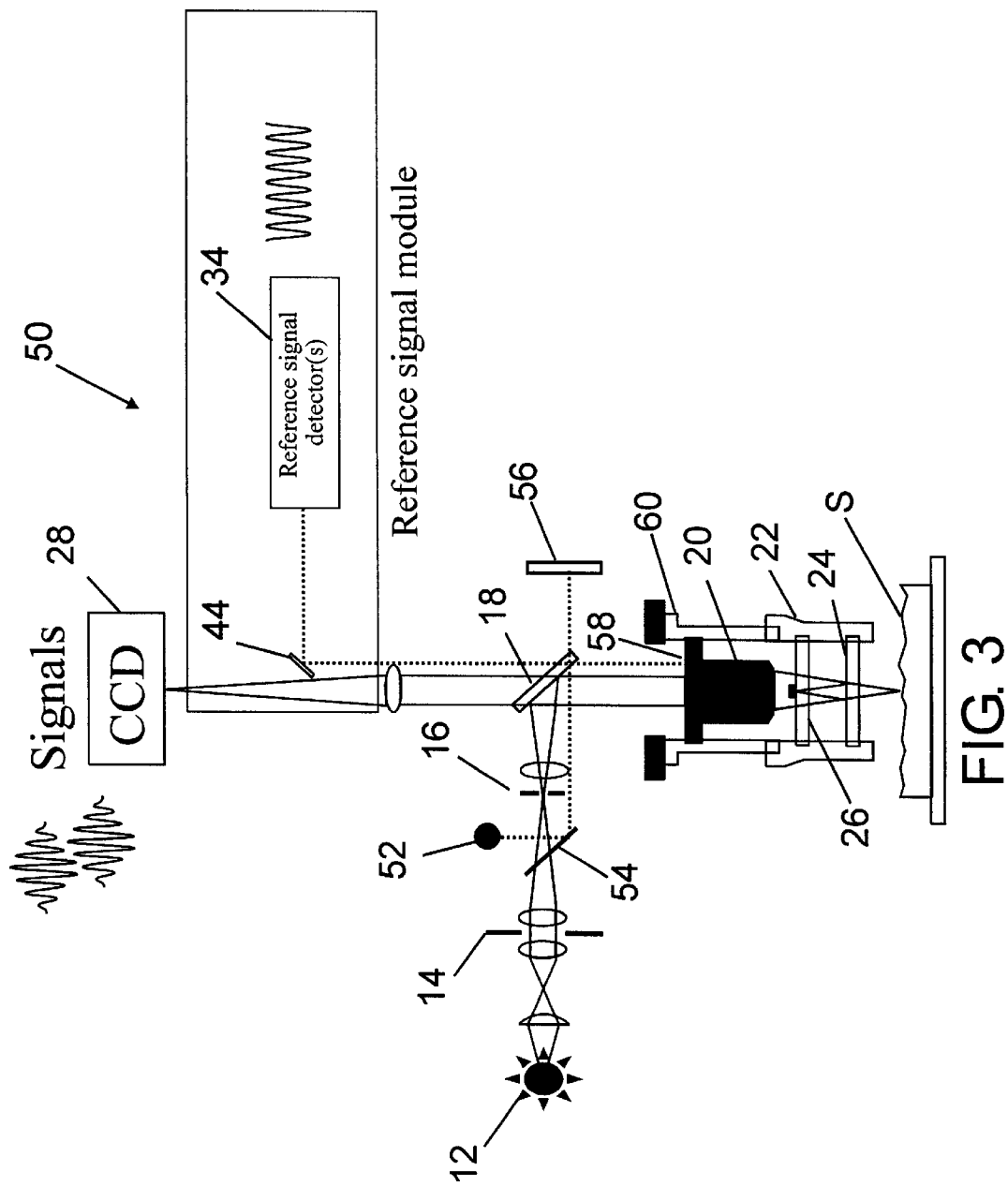
FIG. 3 is a schematic representation of an embodiment of the invention with an internal reference interferometer sharing part of the optical path with the profilometer.

According to yet another embodiment 50 of the invention, illustrated in FIG. 3, an additional reference-signal interferometer is built into the conventional measurement interferometer of the instrument and is dedicated to monitor OPD changes through a separate reference-signal channel. The two interferometers can share a significant portion of the profiler's optics (such as the beam splitter 18 and various lenses), but provide independent signal channels that can be tuned separately without affecting either the measurement or the reference path. In one embodiment, a laser 52 is used to provide enough light for a good-quality reference signal and a beamsplitter 54 is added in the optical measurement path to direct the laser beam toward the main splitter 18. A portion of the light is passed through to a reference mirror 56 for the reference signal, while the balance of the light is reflected toward a mirror or other reflective element 58 (such as a corner cube or a reflecting grating) placed on the moving part of the scanner 60 of the measurement interferometer.

Figure 4:
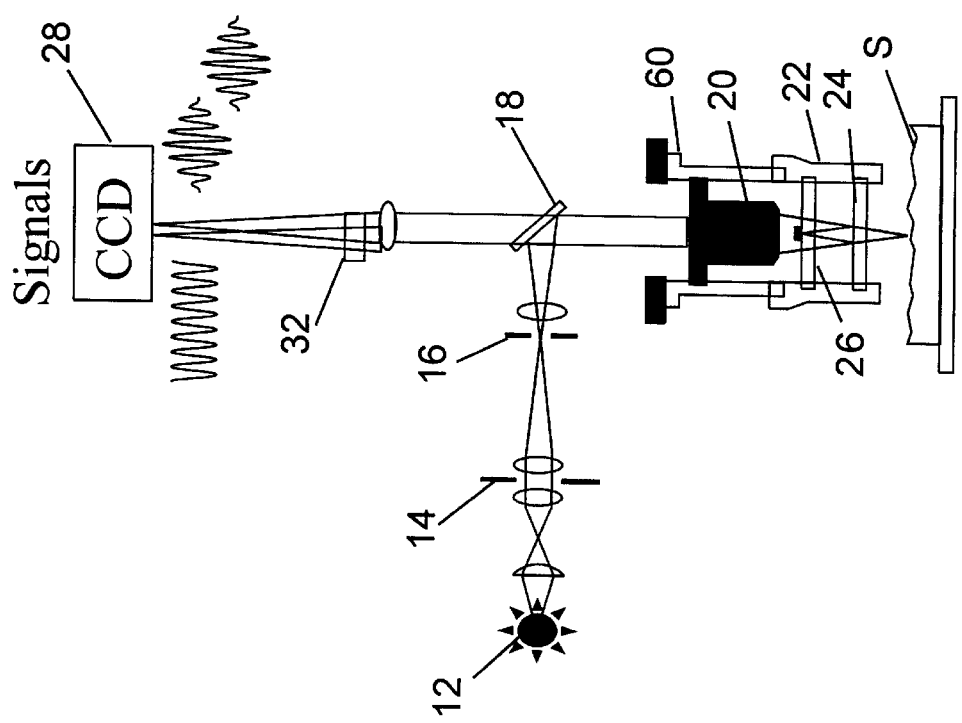
FIG. 4 is a schematic representation of the same embodiment of FIG. 1 where the measurement detector, instead of a separate reference detector, is also used for the reference signal.

Note that the concept of the invention can also be implemented in a system where the reference signal is recorded using the same detector 28 provided for the measurement signal, as illustrated in FIG. 4 with reference to the embodiment of FIG. 1. In such a case, a portion of the measurement beam is passed through a narrow-band filter 32 prior to detection by particular pixels in the measurement detector 28. In this configuration, the reference signal does not record actual changes in the profiler/object distance, but, under the commonly accepted assumption that most system errors are generated by the scanner, this simple approach can be used advantageously to provide a reference signal that tracks scanner motion. At the same time, the approach affords a great degree of freedom in the selection of the light source for the reference signal and no other optical elements need to be introduced in the measurement path. Also, the reference-signal acquisition location on the object's surface is not limited to a preselected position.

In any of the mentioned configurations, the idea of the invention is to record reference-signal information in conventional manner and use the irradiance data to calculate the actual z position of the scanner at each acquisition frame. Any of the many interferometric techniques used in the art for calibration of profiler scanners and/or interferometric analysis (including methods used in distance measurement interferometry, DMI) can be utilized to calculate the distance between frames corresponding to each scanning step. For example, an average step size between frames can be calculated from a few intensities registered at each pixel using the well-known Schwider algorithm, which produces the average phase step (in radians) of four steps between five consecutive frames as follows:

$$\Delta\Phi_{avg} = \arccos(I5-I1)/[2(I4-I2)], \quad (1)$$

where I1–I5 are five consecutive frames (1–5) of intensity data measured for a given pixel around the frame of interest (typically frame 3 in the sequence of 5, but the value could be used equivalently with respect to any intermediate step between frames 1 and 5).

Since the reference-signal light source is selected to have a coherence length covering the entire scanning range of the interferometer, sufficient contrast is available during the entire scan and no calculation of modulation threshold is necessary. Thus, a good approximation of the local phase step can be calculated throughout the scan based on the registered correlogram generated by the reference signal.

One advantage of the technique is that the phase step can be calculated during the scan with each consecutively collected reference-signal irradiance data and the resulting true step-size values can then be used with any interferometric technique to correct scanner-motion deviations from the calibrated trajectory. The correction can be carried out "on-the-fly" to obtain an immediate precise measurement, or after the scan is completed and the corrected step sizes are then used in the form of a look-up table. That is, whether PSI, VSI, LSI or PSIOTF is being implemented, the step sizes produced by Equation 1 with reference-signal irradiance data can be used directly in the processing routines for the measurement-signal data instead of the nominal scanner values. It is understood that phase steps between frames (expressed in radians) can routinely be converted to scanner step sizes (expressed in nm or other length dimension) when the information about the wavelength of the light used is taken into account.

Figure 5:
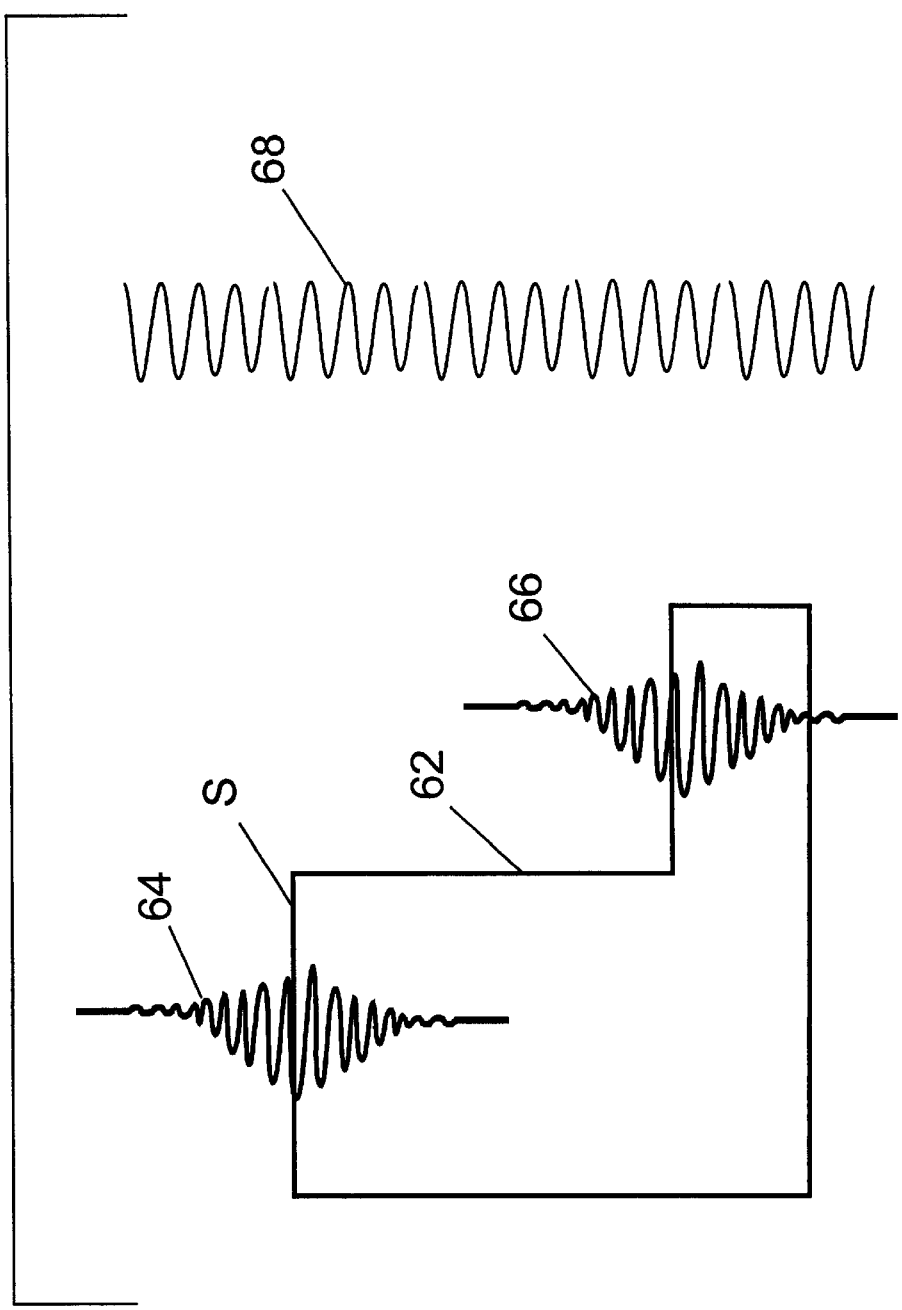
FIG. 5 shows a large-step test surface with measurement and reference modulation curves to illustrate the advantage of using a reference signal according to the invention.

The advantage of using the reference signal of the invention for measuring phase steps is illustrated by the examplary modulation curves depicted in FIG. 5. In the typical situation where a test surface S features a large interpixel step 62 (as shown), a VSI technique with a low-coherence light source is generally used to profile the surface. In such cases, the modulation information for the pixels separated by the step 62 (represented schematically by the modulation curves 64 and 66) do not overlap and the relative distance of the two modulation peaks has to be calculated using calibrated scanner step information. (That is, the distance between the top and the bottom of the step 62 is calculated using the nominal step size and the number of frames between them.) The use of a high-coherence reference signal, depicted by the modulation curve 68, provides continuous information about the scanning quality even when no signal is produced by the measurement channel of the instrument.

An alternative to Equation 1 has been developed for calculating the phase step between frames directly from a sequence of intensity data collected during the scan. Conventional numerical phase calculations are carried out using the well-known arctan function having the general form:

$$\Phi = \arctan(N/D), \quad (2)$$

where N and D are numerical approximations of $\int_o^{2\pi} I(z)\sin(z)dz$ and $\int_o^{2\pi} I(z)\cos(z)dz$, respectively; z is the scanner position; and I(z) is the intensity measured at scan position z. For example, a commonly used five-frame algorithm for a system having a nominal phase step of $\pi/2$ is given by $$N = 2(I4 - I2) \quad (3)$$

and $$D = (I1 - 2I3 + I5), \quad (4)$$

where I1–I5 are again five intensity values for consecutive frames (1–5) measured for a given pixel. However, the phase step $\Delta\Phi_n$ between frames n and n−1 is simply equal to $\Phi_n - \Phi_{n-1}$. Accordingly, through trigonometric manipulation of the quantity $\tan(\Phi_n - \Phi_{n-1})$, the following general expression is derived:

$$\tan(\Phi_n - \Phi_{n-1}) = (N_n D_{n-1} - D_n N_{n-1})/(N_n N_{n-1} + D_n D_{n-1}), \quad (5)$$

from which the phase step of interest can be calculated directly as follows:

$$\Delta\Phi_n = \Phi_n - \Phi_{n-1} = \arctan(N_n D_{n-1} - D_n N_{n-1})/(N_n N_{n-1} + D_n D_{n-1}), \quad (6)$$

where the indices n and n−1 in the numerator N and the denominator D correspond to the frames n and n−1 between which the phase step $\Delta\Phi_n$ is being calculated. In addition to being more precise than the arccosine function of Equation 1, this algorithm, being based on an arctangent function, is also more numerically stable and less susceptible to noise in the irradiance data.

If the scanner motion is reliably repeatable, once the characteristics of the scanner are determined, an average scanner step can be used for PSI as well as VSI calculations (used in VSI, PSIOTF and PSI+VSI), or the real scanner step between each frame of collected data can be used in the same algorithms. This could be especially useful for measurements carried out at a sampling frequency of $3\pi/2$ because errors are magnified by the correspondingly higher scanner speed.

The value of the effective wavelength used for the reference signal is selected for good results and is kept as constant as possible. However, as is well understood in the art, the effective wavelength detected by the camera may vary with different bulb intensities because of the fairly large bandwidth used for the measurement channel. For example, in VSI a large bandwidth is used to produce a contrast peak; when the intensity of the light source is changed to adjust measurement, changes in the mean wavelength may also occur. In addition, the effective wavelength of the measurement light is typically not as well known as for laser or narrow-bandwidth filtered light. By having a constant wavelength in the reference signal, it is possible to measure changes due to PZT and vibrations and also to determine to what degree the effective wavelength of the measurement light detected by the camera is affected by either the bulb's characteristics (i.e. changes in voltage and time) or by spectral reflectance of the material.

The invention can be implemented with a single point detector for the reference signal, or with a multiple point detector to reduce the influence of noise. Alternatively, in order to reduce the noise in the average phase calculated from the reference signal, a second camera can be used to detect reference-signal fringes of high coherence from an entire surface, rather than from a few pixels.

Figure 6:
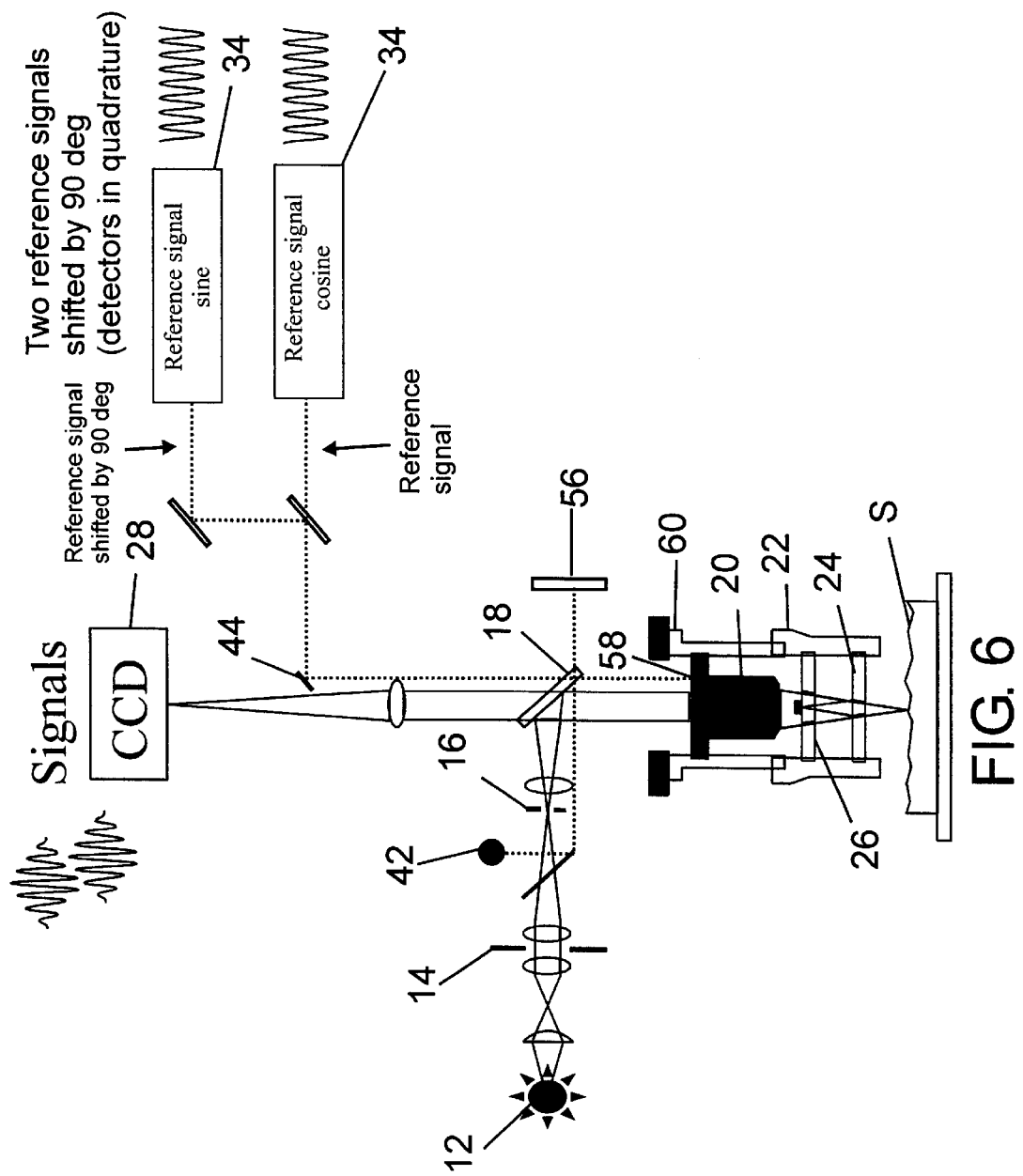
FIG. 6 is a schematic representation of an embodiment of the invention with two reference detectors adapted to receive two reference signals in quadrature.

Those skilled in the art will recognize that the reference signal could be split into two signals shifted by 90 degrees (in software or by means of optical elements), which could then be used as reference signals in a synchronous detection technique, as illustrated in FIG. 6. (Note that ideal simulated reference signals are used in PSI analysis, which is a special case of synchronous detection.) Alternatively, the phase of one of the signals and correspondingly the position of the scanner can be determined directly from the synchronous reference signals in quadrature using any DMI technique. At each pixel, the phase of the measured signal with respect to the reference signal could be determined for every frame. Then, this phase would be added to a real shift (position) of the scanner determined from the reference signal.

Figure 7:
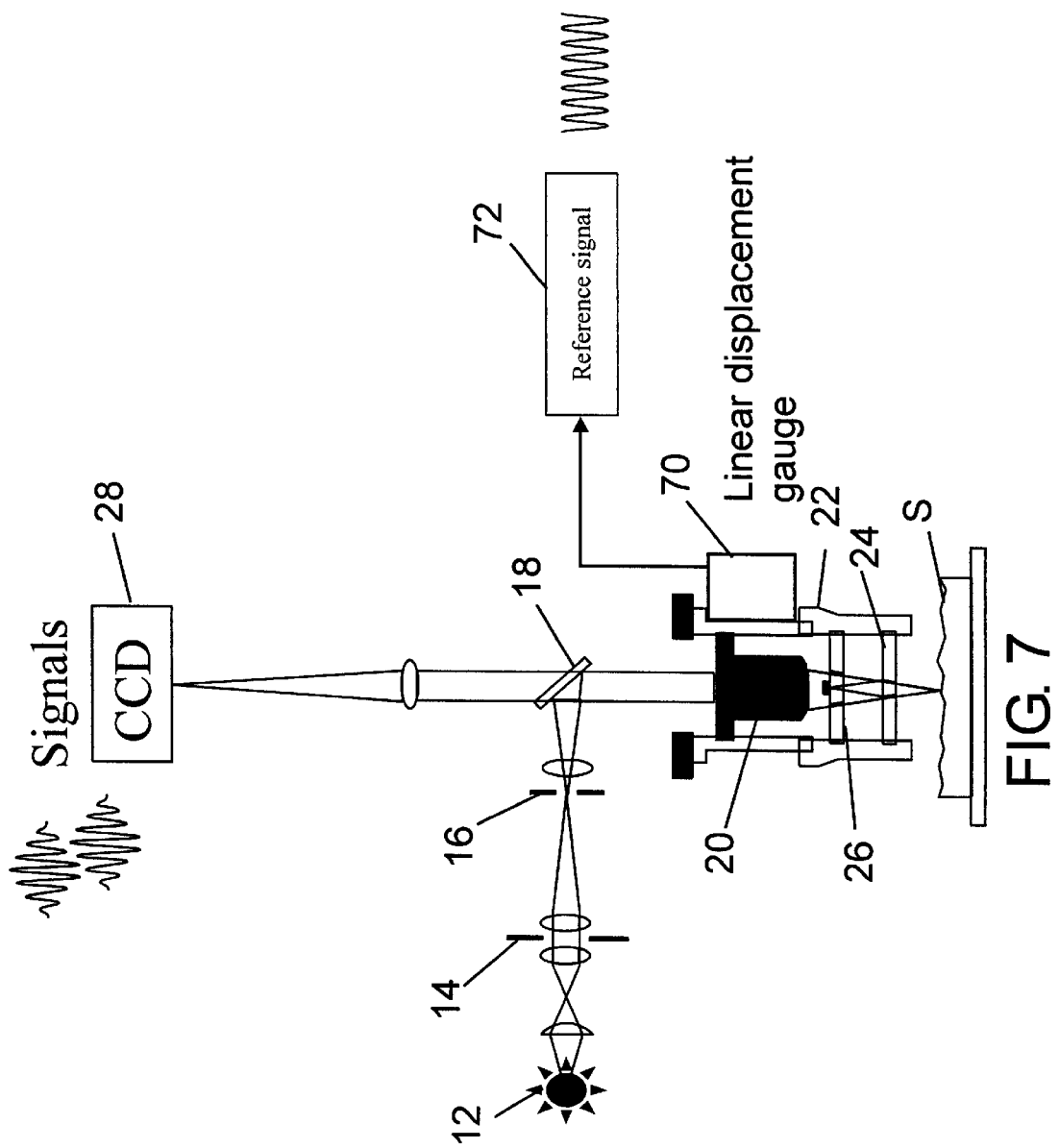
FIG. 7 is a schematic representation of an embodiment of the invention wherein the reference signal is produced by non-optical means.

It is also noted that the invention has been described in terms of an optical reference signal, but one skilled in the art would readily appreciate that it must not necessarily be so. The important feature of the invention is the idea of providing a measure of actual scanner motion independent of the interferometric measurement data acquired during the scan. Therefore, any position device 70 that provides a precise measure (through appropriate hardware 72) of the scanner's relative displacement in the z direction at each data acquisition frame would be suitable for practicing the invention in equivalent manner, as illustrated in FIG. 7. For example, currently available displacement gauges, such as linear encoders, capacitive sensors, linear variable differential transformers (LVDTs), and eddy-current sensors, provide measurements with precision in the order of nanometers which could be used advantageously to practice the invention.

Thus, the concept of the invention enables the use of low-coherence light for VSI, LSI, PSIOTF or just PSI measurements, thereby allowing for flexible and better measurement results, while at the same time utilizing the uninterrupted high-coherence signal provided by the reference channel for scan motion correction. Finally, because of the independent nature of the reference signal, it may also yield information about vibrations and air turbulence that may be present during measurements.

Various changes in the details, steps and components that have been described may be made by those skilled in the art within the principles and scope of the invention herein illustrated and defined in the appended claims. For example, it is understood that the reference signal of the invention may be sampled advantageously at much higher rates (e.g., at $\pi/100$) than the measurement signal, thereby reducing the effect of noise. Since irradiance signals are essentially sinusoidal, the reference value corresponding to each measurement frame can then be fitted in conventional manner to provide better information than could be derived from sampling at the measurement rate.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method of correcting scanning errors in an interferometric profilometer adapted to execute interferometric measurements by illuminating a test surface and a first reference surface aligned in a first optical path with a measurement beam. adapted to provide a plurality of measurement interference patterns on a measurement detector as the optical path difference between said test surface and first reference surface is varied with a scanner calibrated to produce a sequence of nominal phase steps within a range of scanning operation, the method comprising the following steps:

(a) providing a reference beam of coherence length sufficient to cover said range of scanning operation;
   (b) directing the reference beam toward a reflective surface and a second reference surface aligned in a second optical path adapted to provide a plurality of reference interference patterns on a reference detector as the optical path difference between said reflective surface and second reference surface is varied with said scanner between acquisition frames of the reference detector;
   (c) performing an irradiance analysis on said plurality of reference interference patterns to calculate phase changes produced between said acquisition frames at the reference detector by said nominal phase steps of the scanner during said scanning operation; and
   (d) performing interferometry analysis of the measurement interference patterns utilizing said phase changes calculated in step (c).

2. The method of claim 1, wherein said reference beam is produced by passing a portion of the measurement beam through a narrow-bandwidth filter.

3. The method of claim 1, wherein said reference beam is produced by a narrow-bandwidth source.

4. The method of claim 1, wherein said reflective surface is associated with the test surface.

5. The method of claim 1, wherein said reflective surface is the test surface.

6. The method of claim 1, wherein said reflective surface is mounted on the scanner.

7. The method of claim 1, wherein said measurement and reference beams are substantially coextensive.

8. The method of claim 1, wherein said measurement and reference detectors are included in a single detector unit.

9. The method of claim 1, wherein each of said nominal scan steps corresponds to a phase step of $\pi/2$.

10. The method of claim 1, wherein each of said nominal scan steps corresponds to a phase step of $3\pi/2$.

11. Apparatus for correcting scanning errors in an interferometric profilometer with an objective adapted to execute interferometric measurements by illuminating a test surface and a first reference surface with a measurement beam adapted to provide a plurality of measurement interference patterns on a measurement detector as the optical path difference between said test surface and first reference surface is varied with a scanner calibrated to produce a sequence of nominal phase steps within a range of scanning operation, said apparatus comprising:

(a) a light source adapted to produce a reference beam along an optical path exterior to said objective of the profilometer, said reference beam having a coherence length sufficient to cover said range of scanning operation;
   (b) a reflective surface;
   (c) a second reference surface;
   (d) a reference detector;
   (e) means for directing the reference beam toward the reflective surface and the second reference surface to provide a plurality of reference interference patterns on the reference detector as the optical path difference between the reflective surface and the second reference surface is varied with said scanner between acquisition frames of the reference detector;
   (f) means for performing an irradiance analysis on said plurality of reference interference patterns to calculate phase changes produced between said acquisition frames of the reference detector by said nominal phase steps of the scanner during said scanning operation; and
   (g) means for performing interferometric analysis of the measurement interference patterns utilizing said phase changes.

12. The apparatus of claim 11, wherein said light source is a portion of the measurement beam passed through a narrow-bandwidth filter.

13. The apparatus of claim 11, wherein said light source is a narrow-bandwidth source.

14. The apparatus of claim 11, wherein said reflective surface is mounted on the scanner.

15. The apparatus of claim 11, wherein said measurement and reference detectors are included in a single detector unit.

16. The apparatus of claim 11, wherein each of said nominal scan steps corresponds to a phase step of $\pi/2$.

17. The apparatus of claim 11, wherein each of said nominal scan steps corresponds to a phase step of $3\pi/2$.

18. The apparatus of claim 1, further including means for producing two signals in quadrature from said reference signal, and wherein said reference detector comprises two units, each unit being adapted to detect one of said signals in quadrature.

19. A method of correcting scanning errors in an interferometric profilometer adapted to execute interferometric measurements by illuminating a test surface and a reference surface aligned in an optical path with a beam adapted to provide a plurality of interference patterns on a detector as the optical path difference between said test surface and reference surface is varied with a scanner calibrated to produce a sequence of nominal phase steps within a range of scanning operation, the method comprising the following steps:

(a) providing a displacement gauge adapted to produce a scanner position corresponding to each of said nominal phase steps within the range of scanning operation; and
   (b) performing interferometry analysis of the interference patterns utilizing said scanner positions produced in step (a).

20. The method of claim 19, wherein said displacement gauge includes a linear encoder.

21. The method of claim 19, wherein said displacement gauge includes a capacitive sensor.

22. The method of claim 19, wherein said displacement gauge includes a linear variable differential transformer.

23. The method of claim 19, wherein said displacement gauge includes an eddy-current sensor.

24. A method of correcting scanning errors in an interferometric profilometer with an objective adapted to execute interferometric measurements by illuminating a test surface and a first reference surface aligned in a first optical path with a measurement beam adapted to provide a plurality of measurement interference patterns on a measurement detector as the optical path difference between said test surface and first reference surface is varied with a scanner calibrated to produce a sequence of nominal phase steps within a range of scanning operation, the method comprising the following steps:

(a) providing a reference beam of coherence length sufficient to cover said range of scanning operation;

(b) directing the reference beam toward a reflective surface and a second reference surface aligned in a second optical path adapted to provide a plurality of reference interference patterns on a reference detector as the optical path difference between said reflective surface and second reference surface is varied with said scanner, said second optical path being exterior to said objective of the profilometer:

(c) performing an irradiance analysis on said plurality of reference interference patterns to calculate phase changes produced by said nominal phase steps of the scanner during said scanning operation; and (d) performing interferometry analysis of the measurement interference patterns utilizing said phase changes calculated in step (c);

wherein said test surface and reflective surface are separate optical elements of the profilometer.

25. The method of claim 24, wherein said reflective surface is mounted on the scanner.

26. The method of claim 24, wherein each of said nominal scan steps corresponds to a phase step of $\pi/2$.

* * * * *

UNITED STATES PATENT AND TRADEMARK OFFICE
CERTIFICATE OF CORRECTION

PATENT NO. : 6,624,894 B2  Page 1 of 1
DATED : September 23, 2003
INVENTOR(S) : Artur Olszak et al.

It is certified that error appears in the above-identified patent and that said Letters Patent is hereby corrected as shown below:

Column 11,
Line 41, replace "at" with -- of --

Signed and Sealed this

Thirtieth Day of December, 2003

JAMES E. ROGAN
*Director of the United States Patent and Trademark Office*